(12) United States Patent
Kaito et al.

(10) Patent No.: US 6,805,993 B2
(45) Date of Patent: Oct. 19, 2004

(54) RECHARGEABLE BATTERY WITH TEMPERATURE CONTROLLED SWITCH

(75) Inventors: Tsuyoshi Kaito, Kyoto (JP); Shinji Mino, Ibaraki (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 81 days.

(21) Appl. No.: 09/829,296

(22) Filed: Apr. 9, 2001

(65) Prior Publication Data

US 2001/0044044 A1 Nov. 22, 2001

(30) Foreign Application Priority Data

Apr. 12, 2000 (JP) ........................................ 2000-110269

(51) Int. Cl.[7] .............................................. H01M 10/50
(52) U.S. Cl. .......................................... 429/62; 429/61
(58) Field of Search ...................................... 429/61, 62

(56) References Cited

U.S. PATENT DOCUMENTS

| | | | | |
|---|---|---|---|---|
| 6,045,939 A | * | 4/2000 | Tateno et al. | ........... 429/62 |
| 6,187,472 B1 | * | 2/2001 | Shiota et al. | ........... 429/127 |
| 6,342,826 B1 | * | 1/2002 | Quinn et al. | ........... 337/300 |

FOREIGN PATENT DOCUMENTS

| | | |
|---|---|---|
| JP | 8-185849 | 7/1996 |
| JP | 10-255757 | 9/1998 |
| JP | 11-40204 | 2/1999 |

* cited by examiner

Primary Examiner—Dah-Wei Yuan
(74) Attorney, Agent, or Firm—Jordan and Hamburg LLP

(57) ABSTRACT

A non-aqueous electrolyte rechargeable battery is provided with a switch element in a circuit for connecting the battery to an external power source, the switch element being operable in response to a change in temperature of the battery, thereby disconnecting the battery from the circuit and establishing a short circuit across the positive electrode and the negative electrode, the switch element being capable of restoring to its initial state in response to a change in temperature of the battery.

12 Claims, 5 Drawing Sheets

RECHARGEABLE BATTERY WITH TEMPERATURE CONTROLLED SWITCH

BACKGROUND OF THE INVENTION

1. Field of the Invention

The present invention relates to a non-aqueous electrolyte rechargeable battery, and particularly to an improved safety feature provided to the battery.

2. Description of Related Art

Small, light-weight rechargeable batteries having high energy density are widely used as power source for portable electronic devices. While non-aqueous rechargeable batteries including lithium ion based batteries and lithium ion polymer batteries can output a high voltage, it is essential to ensure that in no circumstances should the batteries let liquid electrolyte leak and, it is desirable that the batteries maintain their high performance even under harsh conditions.

Battery characteristics may deteriorate when the battery is used under a condition exceeding an appropriate range of voltage or temperature. Also, if the battery is subjected to over-charging or left at high temperature, leakage of electrolyte may occur due to a rise in internal pressure. Accordingly, various protective devices for batteries have been proposed.

For example, Japanese Laid-open Patent Application No. 8-185849 proposes a protective device having a shape-memory alloy to shut off the electricity supply from outside of the battery upon an abnormal rise in temperature. Japanese Laid-open Patent Application No. 11-40204 teaches separation of the battery from a charging circuit upon detecting a rise in the internal pressure or temperature of the battery. It also proposes protection of battery from over-charging by the use of a varistor element that operates at a voltage exceeding a predetermined value. Japanese Laid-open Patent Application No. 10-255757 proposes a protective device having a shape-memory alloy to cause short-circuiting across the positive and negative electrodes upon detection of an abnormal rise in the temperature of the battery.

While the protective devices proposed by the above-mentioned Japanese Laid-open Patent Application No. 8-185849 and No. 11-40204 provide safety measures for preventing over-charging of the battery, the battery after the protective device has been operated is in an over-charged state. Thus there remains the risk that leakage of electrolyte may occur or that the battery characteristics may deteriorate.

The protective device disclosed in Japanese Laid-open Patent Application No. 10-255757 prevents over-charging of the battery by causing the battery to discharge, and therefore, the battery is still connected to the charging circuit after the protective device has been operated. Thus there is the risk that the battery may be further charged particularly if large current flows.

SUMMARY OF THE INVENTION

The present invention has been devised in view of the above-described problems in prior art, and it is an object of the invention to improve the reliability of non-aqueous electrolyte rechargeable batteries.

To achieve the object, a non-aqueous electrolyte rechargeable battery according to one aspect of the invention includes a switch element provided in a circuit for connecting the battery to an external power source. The switch element is operable in response to a change in temperature of the battery, thereby disconnecting the battery from the circuit and establishing a short circuit across the positive electrode and the negative electrode, the switch element being capable of restoring to its initial state in response to a change in temperature of the battery.

A non-aqueous electrolyte rechargeable battery according to another aspect of the invention includes a closure assembly for closing the open top end of a battery case that is electrically connected to the electrode of first polarity. The closure assembly includes an external terminal, an internal terminal electrically connected to the electrode of second polarity, a switch element in electrical contact with both of the external terminal and the internal terminal, and a ring-like conductive element electrically connected to the battery case and electrically insulated from both of the external terminal and the internal terminal. The switch element disconnects itself from the external terminal and makes electrical contact with the ring-like conductive element in response to a change in temperature of the battery, thereby breaking electrical connection between the battery and an external power source and establishing a short circuit to cause the battery to discharge, the switch element being capable of restoring to its initial state in response to a change in temperature of the battery, thereby re-establishing electrical connection between the battery and the external power source.

These and other objects and characteristics of the present invention will become further clear from the following description with reference to the accompanying drawings.

DESCRIPTION OF THE PREFERRED EMBODIMENTS

Figure 1:
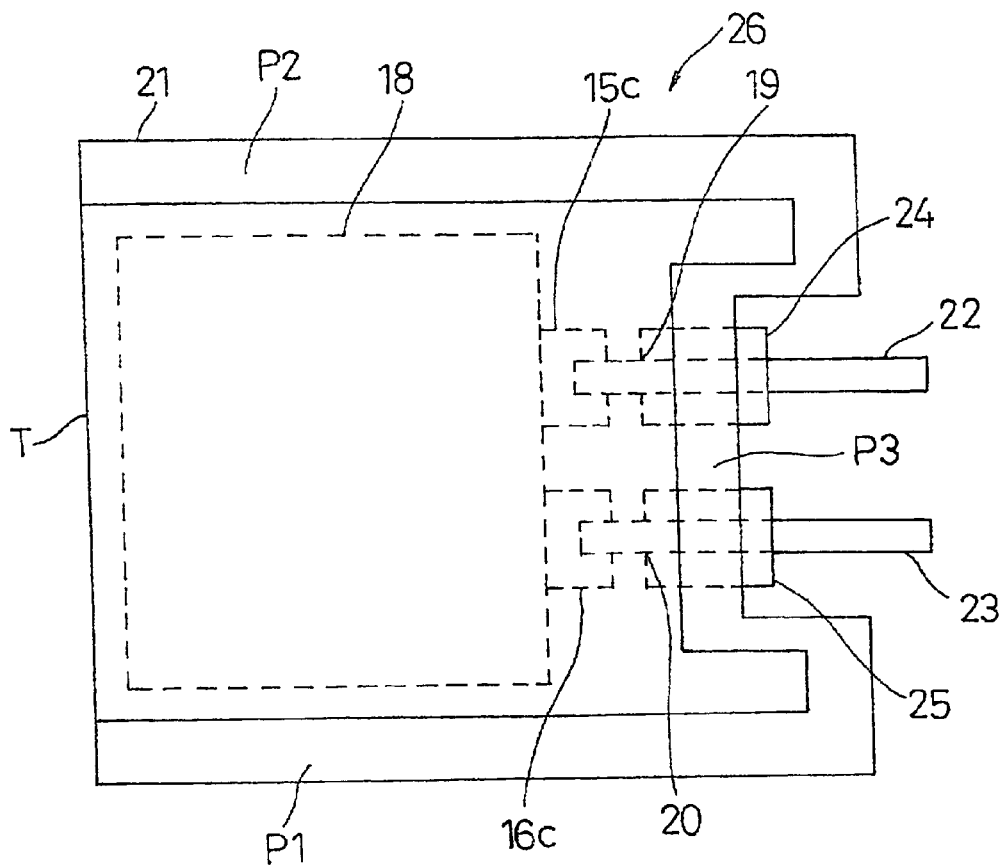
FIG. 1 is a schematic top plan view of a battery according to one embodiment of the present invention before a switch element is mounted thereto.
Figure 2:
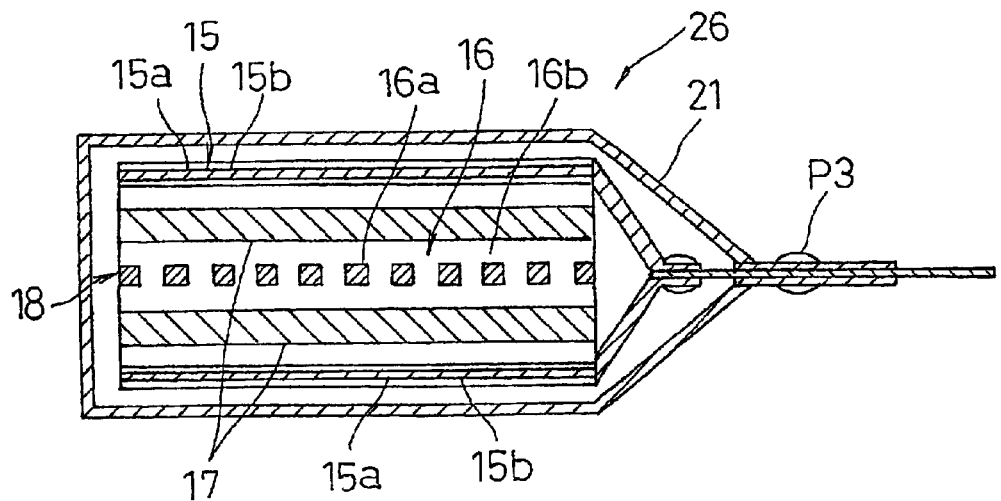
FIG. 2 is a schematic cross-sectional view of the battery.

Preferred embodiments of the present invention will be hereinafter described in the form of a lithium ion polymer battery and a lithium ion rechargeable battery as examples. FIG. 1 is a top view and FIG. 2 is a cross-sectional view of a lithium ion polymer battery according to one embodiment of the present invention, before a switch element is mounted thereto.

The positive electrode 15 of the battery is composed of a collector 15a made of a meshed aluminum foil and a positive electrode active material layer 15b formed on both surfaces of the collector 15a. The active material for the positive electrode is prepared in the form of a paste obtained by mixing $LiCoO_2$, acetylene black as a conductive material, and a copolymer of, for example, vinylidene fluoride (VDF) and hexafluoropropylene (HFP) as a binder which also serves to retain the electrolyte, in an organic solution. The paste thus obtained is applied onto the collector 15a and dried.

The negative electrode 16 of the battery is composed of a collector 16a made of copper foil and a negative electrode active material layer 16b formed on both surfaces of the collector 16a. The active material for the negative electrode is prepared in the form of a paste obtained by mixing carbon and the above-mentioned copolymer (VDF-HFP) in an organic solution. The paste thus obtained is applied onto the collector 16a and dried.

Separators 17 made of the above-mentioned polymer (VDF-HFP) in the form of a film are arranged on both faces of one negative electrode 16, and this is interposed between two positive electrodes 15. The positive electrodes 15 and the negative electrode 16 with the separators 17 therebetween are thus laminated as shown in FIG. 2 to constitute an element for electromotive force 18. Reference numeral 15c in FIG. 1 represents a lead mounting portion, to which a positive electrode lead 19 made of aluminum is welded. Likewise, reference numeral 16c represents a lead mounting portion for the negative electrode, to which a negative electrode lead 20 made of copper is welded.

The element for electromotive force 18 is enclosed in a bag 21 made of an aluminum-laminated resin film. The film is composed of an aluminum foil as an intermediate layer, a polypropylene film bonded to an inner side of the aluminum foil, and a polyethylene terephthalate film and a nylon film bonded to an outer side of the aluminum foil. The positive electrode lead 19 and the negative electrode lead 20 are drawn out from the bag 21, their respective ends serving as input/output terminals 22, 23. The leads 19 and 20 are respectively provided with insulating protective films 24, 25 in an intermediate portion thereof, for providing electrical insulation from each other and a liquid-tight seal when the opening of the bag 21 is closed by hot melt-bonding or the like.

The bag 21 is formed by folding a strip of aluminum-laminated resin film in half at a centerline T, and by bonding together the upper and lower side edges P1, P2 of the bag by hot melt-bonding. The element for electromotive force 18 is inserted into the bag 21 through the remaining one side P3 which is open. The open side P3 is then closed by hot melt-bonding after injection of a prescribed amount of liquid electrolyte. For the electrolyte, 1.5 mol/l of $LiPF_6$ dissolved in a mixed solvent consisting of ethylene carbonate (EC), diethyl carbonate (DEC) and methyl propionate (MP) in the volume ratio of 30:50:20 was employed.

Figure 3:
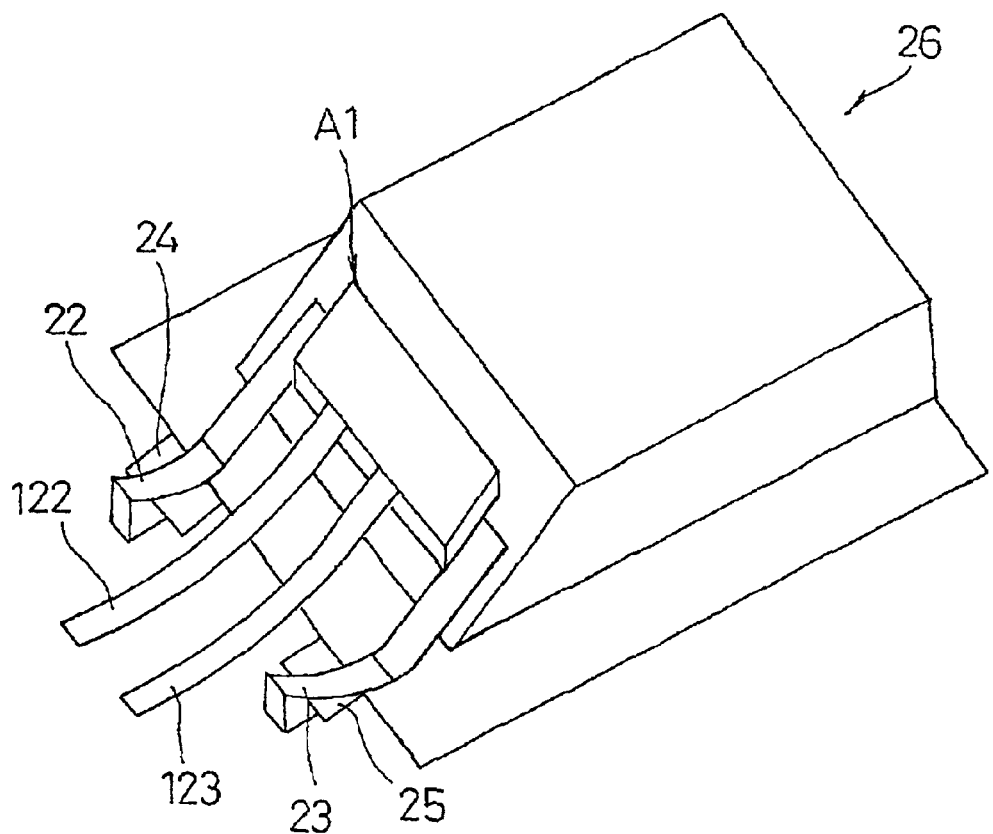
FIG. 3 is a perspective view of the battery with a switch element mounted thereto.

A switch element A1 is provided to the above-described battery such as to contact the bag 21 for sensing the temperature of the battery. For example, the switch element A1 may be attached to one end of the bag 21 as shown in FIG. 3 where the input/output terminals 22, 23 are drawn out from the bag 21. The input/output terminals 22, 23, respectively connected to the internal positive and negative electrode terminals in the form of the positive and negative electrode leads 19, 20, enter the switch element A1 and are respectively connected to a first and a second conductive plates, to be described, that constitute the switch element A1. Reference numerals 122, 123 denote positive and negative external terminals drawn out from the switch element A1.

Figure 4:
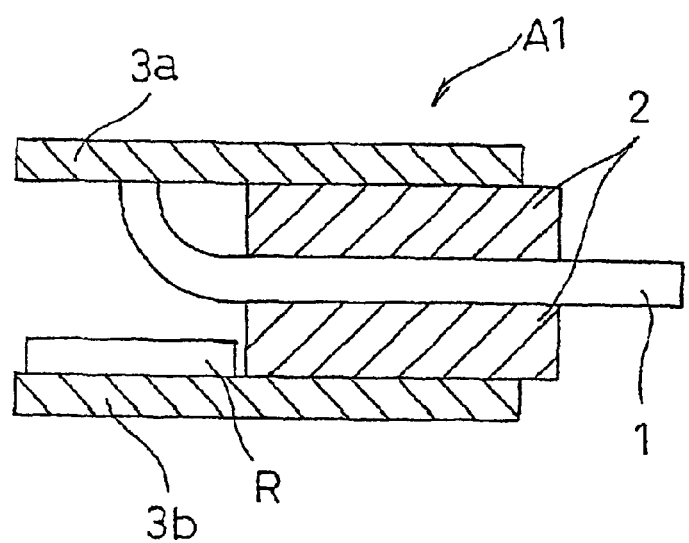
FIG. 4 is a schematic cross-sectional view of a switch element provided in the battery.

The switch element A1 includes a temperature-sensitive element 1 made of shape-memory alloy, part of which is sandwiched between insulators 2, and a first conductive plate 3a and a second conductive plate 3b arranged on both outer sides thereof as shown in FIG. 4. A resistor is provided on the second conductive plate 3b. Initially, the temperature-sensitive element 1 is electrically connected to the internal terminal of one polarity, while the first conductive plate 3a is connected to the external terminal of the same polarity. The second conductive plate 3b is connected to both of the internal terminal and external terminal of the other polarity. In the illustrated example, the temperature-sensitive element 1 is initially connected to the positive electrode lead 19 through the input/output terminal 22, and the first conductive plate 3a is connected to the positive electrode external terminal 122. The second conductive plate 3b is connected to both of the negative electrode lead 20 through the input/output terminal 23 and the negative electrode external terminal 123. Thus the temperature-sensitive element 1 is interposed in a circuit that connects the battery to an external power source.

The shape memory alloy forming the temperature-sensitive element 1 deforms when the battery temperature exceeds 60° C., whereby it detaches from the first conductive plate 3a and makes contact with the second conductive plate 3b via the resistor, thus establishing a short circuit across the positive and negative electrodes of the battery, causing the battery to discharge. As the temperature returns to a normal level, the shape-memory alloy restores to its initial shape, whereby it detaches from the second conductive plate 3b and makes contact with the first conductive plate 3a, thus reestablishing the charging circuit between the battery and the external power source. In this way, should the battery charger malfunction, the switch element A1 disconnects the battery from the charging circuit and at the same time causes the battery to discharge.

Instead of providing the switch element A1 on the bag 21 on the side where the input/output terminals are drawn out, it may be located anywhere at which it is connected to the circuit across the battery 26 and an external power source and to the discharging circuit, and at which it can detect the battery temperature. The temperature-sensitive element 1 may of course be provided on the side of the negative electrode. The shape memory alloy employed for the temperature-sensitive element 1 in this embodiment restores to its initial shape at a temperature around 25° C. It should go without saying that the temperature range of the shape memory alloy is not limited to the example given above, but may be set as required in accordance with battery size, performance, and the range of temperatures at which the battery is used.

As described above, should the battery be subjected to excessive charging, the charging is made to stop in response to a rise in temperature of the battery, and at the same time the battery is made to discharge. Because of the restorable characteristic of the shape-memory alloy, the switch element A1 permits itself to be repeatedly used, thus allowing the battery to be reused.

Figure 5:
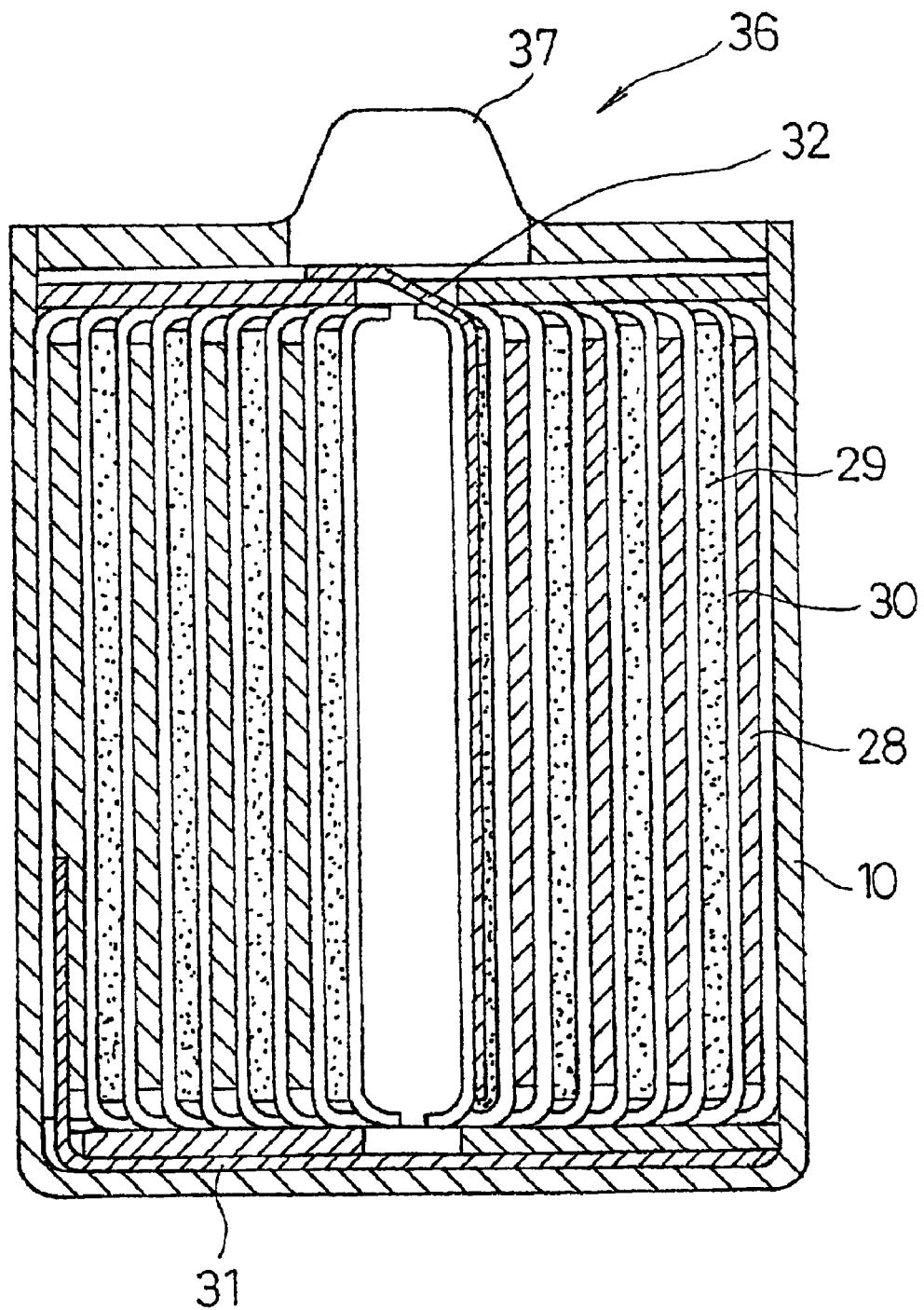
FIG. 5 is a vertical cross-sectional view of a battery according to another embodiment of the present invention.

FIG. 5 is a vertical cross-sectional view of a lithium ion rechargeable battery according to another embodiment of the present invention.

The positive electrode 28 is composed of a collector made of aluminum foil and a positive electrode active material layer formed on both surfaces of the collector. The active material for the positive electrode is prepared in the form of a paste obtained by mixing $LiCoO_2$, acetylene black as a conductive material, and polytetrafluoroethylene as a binder in an aqueous solution of carboxy methyl cellulose. The paste thus obtained is applied onto the collector and dried.

The negative electrode 29 is composed of a collector made of copper foil and a negative electrode active material layer formed on both surfaces of the collector. The active material for the negative electrode is prepared in the form of a paste obtained by mixing mesophase microspherical powder particles graphitized at high temperature of 2800° C., and styrene-butadiene rubber in an aqueous solution of carboxy methyl cellulose. The paste thus obtained is applied onto the collector and dried.

The positive electrode 28 and the negative electrode 29 are superposed with a polyethylene-based porous film 30 interposed therebetween, and wound around to constitute an electrode group, which is then accommodated in an aluminum-made battery case 10. A switch element B1 is incorporated in a closure assembly 37 for sealing the battery case 10. A positive electrode lead 31 of aluminum is drawn out from the positive electrode 28 such as to make electrical contact with the battery case 10, while a negative electrode lead 32 of copper is drawn out from the negative electrode 29 and electrically connected to the switch element B1.

For the electrolyte, 1.5 mol/l of $LiPF_6$ dissolved in a mixed solution of ethylene carbonate (EC), diethyl carbonate (DEC) and methyl propionate (MP) in the volume ratio of 30:50:20 was employed.

Figure 6:
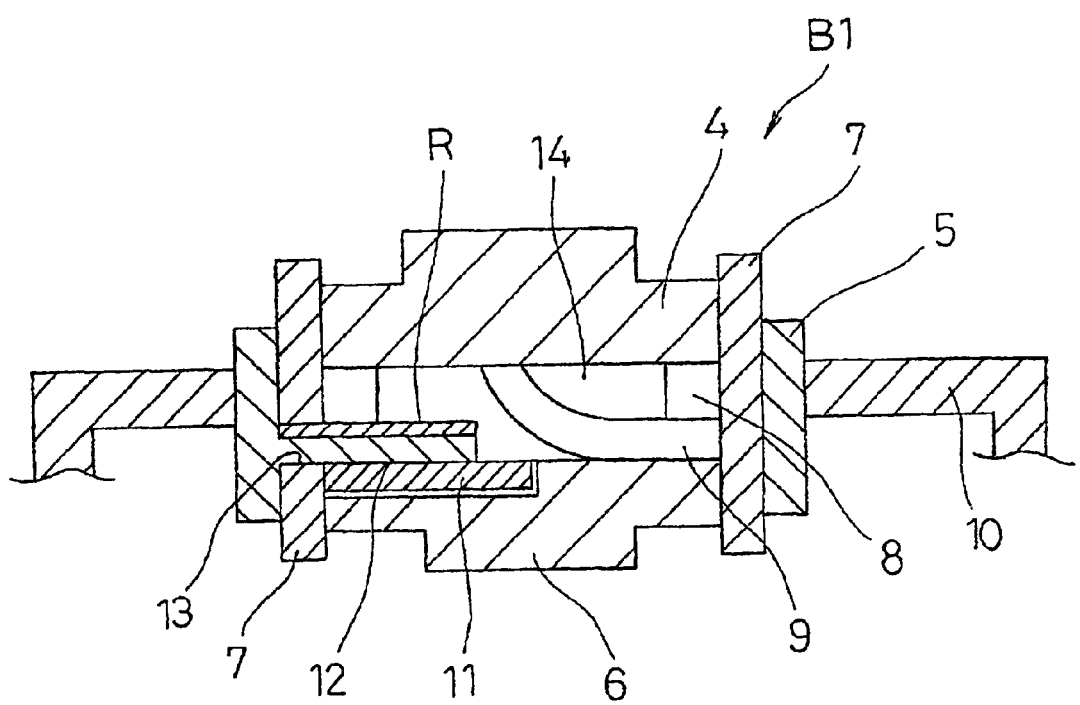
FIG. 6 is a cross-sectional view of a switch element provided in the battery.

The switch element B1 includes, as shown in FIG. 6, an external terminal cover 4 made of metal that serves as an external terminal of the negative electrode, an internal terminal cover 6 made of metal to which the negative electrode lead 32 is connected, a gasket 7 made of insulating material, a metal ring 5, an insulating plate 8, and a temperature-sensitive element 9 composed of shape-memory alloy, which is initially contacted to both of the external terminal cover 4 and the internal terminal cover 6, thereby electrically connecting the two. The internal terminal cover 6 makes partial contact with the temperature-sensitive element 9, and part thereof which is not in electrical contact with the temperature-sensitive element 9 is covered by an insulating member 11. The structure of the external terminal cover 4 and the internal terminal cover 6 may be interchanged. The gasket 7 is arranged surrounding the outer periphery of the external terminal cover 4, the insulating plate 8, the temperature-sensitive element 9, and the internal terminal cover 6. The ring 5 is arranged at the outer periphery of the gasket 7.

The ring 5 is electrically connected to the battery case 10, and has a projection 12 extending inwards on an inner side thereof. The projection 12 of the ring 5 extends inwards through a hole 13 formed in the gasket 7, and sits on the insulating member 11 at an inner side of the gasket 7.

The temperature-sensitive element 9 is interposed between the internal terminal cover 6 and the insulating plate 8, being electrically connected to both of the internal terminal cover 6 and the external terminal cover 4 as mentioned above. The shape-memory alloy forming the temperature-sensitive element 9 deforms when the battery temperature exceeds 60° C., detaching from the external terminal cover 4 and making contact with the protrusion 12 of the ring 5 through a resistor R placed thereon. Thus the battery is separated from the external power source and discharged through a short circuit established by the temperature-sensitive element 9.

The shape-memory alloy restores to its initial shape at around 25° C., but the temperature range of the shape-memory alloy may be set as required depending on the size and performance of the battery. The switch may be located anywhere at which it is connected to the circuit across the battery 36 and an external power source, and at which it can sense the battery temperature.

Figure 7A:
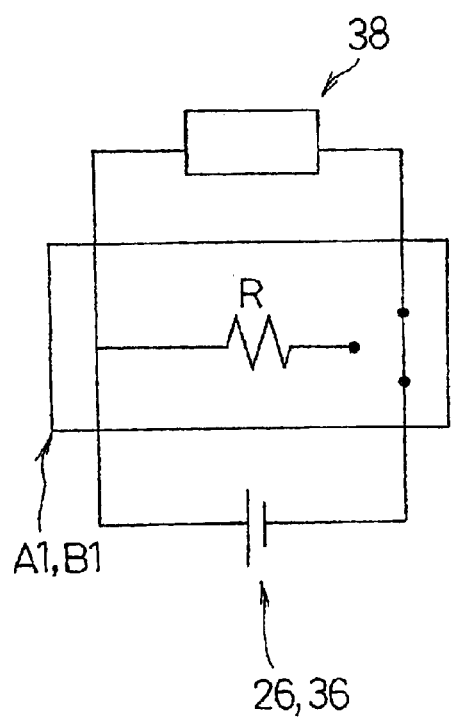
FIGS. 7A and 7B are schematic circuit diagrams, respectively showing an initial state of the switch element according to the invention and a state after the switch element has been operated.
Figure 7B:
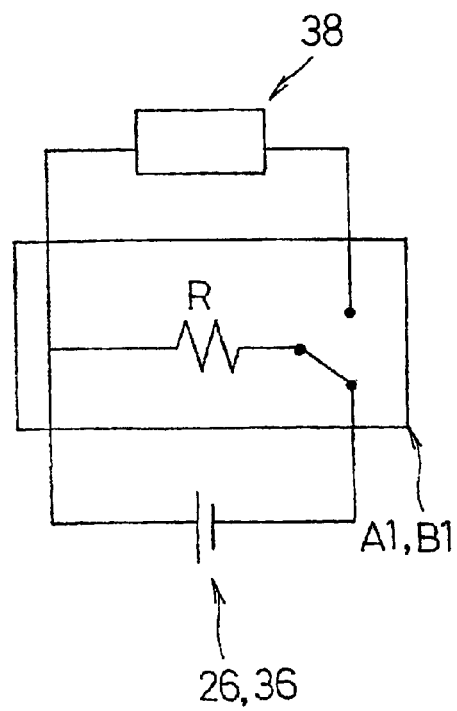

FIG. 7A and FIG. 7B are schematic diagrams of the charge/discharge circuit of the above-described batteries 26, 36 according to the invention, given in explanation of the mechanism how the switch element A1 or B1 disconnects the battery from the charging circuit and causes the battery to discharge in response to a rise in temperature of the battery.

FIG. 7A shows a state before the switch A1 or B1 operates or after it has been restored to its initial state. In this state, the battery 26, 36 and an external power source 38 are electrically connected through the switch element A1 or B1, so that the battery 26, 36 is charged with electricity. FIG. 7B shows a state wherein the switch element A1 or B1 has just operated due to a temperature rise exceeding 60° C.

As shown, the internal and external terminals of same polarity are mutually connected through the switch element A1, B1 in its initial state, and when operated, the switch element A1, B1 switches over to connect internal terminals of opposite polarity to establish a short circuit across the positive and negative electrodes. Accordingly, while the current supply from the external power source 38 is shut off, the battery 26, 36 is discharged. The switch element A1 or B1 includes a resistor R (10 Ω) as described above for preventing large current from flowing during discharging, thus avoiding heat generation of the battery 26, 36. Resistance of the resistor R is not limited to a fixed value but may be set as required in accordance with battery size and performance.

Experiments were conducted to determine the performance of the battery according to the invention in comparison to the prior art battery. Lithium ion polymer batteries as shown in FIGS. 1 and 2 were prepared as example 1, and lithium ion rechargeable batteries as shown in FIG. 5 were prepared as example 2. As comparative examples, lithium ion polymer batteries without the switch element A1 according to the invention were prepared as prior art example 1, and lithium ion rechargeable batteries without the switch element B1 according to the invention were prepared as prior art example 2.

Ten cells were prepared with respect to each of the example 1, example 2, prior art example 1, and prior art example 2, and these were subjected to 3C constant current continuous charging tests. Thereafter, the batteries were left to stand for one hour in an atmosphere at 150° C. The results are shown in Table 1. The numbers in Table 1 represent percentage of the cells in which no leakage was observed.

TABLE 1

| Battery | Leakage-proof property | |
|---|---|---|
| | After 3C continuous charging test (%) | After leaving to stand at 150° C. (%) |
| Example 1 | 100 | 100 |
| Example 2 | 100 | 100 |
| Prior Art Example 1 | 40 | 10 |
| Prior Art Example 2 | 30 | 0 |

As can be seen from Table 1, the batteries provided with the switch elements according to the invention had superior reliability even after they were subjected to continuous charging and left at a high temperature.

Another ten cells were prepared with respect to each of the example 1, example 2, prior art example 1, and prior art example 2, and these were subjected to the following tests to evaluate their performances. The batteries were first charged with constant current and constant voltage at 4.2 V for three hours with a maximum current of 0.7C, and discharged with constant current of 1C until a final voltage of 3.0 V, to determine the initial battery discharge capacity of each type of battery. Next, the batteries were subjected to constant current and constant voltage at 4.4 V for three hours with a maximum current of 0.7° C., and were left to stand for three days in an atmosphere at 85° C. Thereafter, the batteries were discharged with constant current of 1° C. until a final voltage of 3.0V, re-charged with constant current and constant voltage of 4.2V with a maximum current of 0.7° C. for three hours, and discharged with constant current of 1° C. until the final voltage of 3.0 V, so as to determine the discharge capacity after leaving to stand at 85° C. of each battery. Table 2 shows the percentage of discharge capacity that is maintained after the battery has been left at 85° C. with respect to each type of battery (discharge capacity after standing at 85° C./discharge capacity prior to standing at 85° C.).

TABLE 2

| Battery | Percentage of maintained discharge capacity (%) |
|---|---|
| Example 1 | 95 |
| Example 2 | 96 |
| Prior Art Example 1 | 70 |
| Prior Art Example 2 | 80 |

As can be seen from Table 2, the batteries provided with the switch elements according to the invention exhibited superior high-temperature storage characteristics.

The temperature-sensitive element of the switch element of the invention should not be limited to the shape-memory alloy as has been described above, but may be any member that can operate in response to a change in temperature.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A non-aqueous electrolyte rechargeable battery, comprising:
   an element for electromotive force including a positive electrode and a negative electrode;
   a battery case for accommodating the element for electromotive force therein; and
   a switch element attached to the battery case and interposed in a circuit for connecting the battery to an external power source in an initial state of operation, the switch element completing a charging path to the external power source in the initial state of operation, the switch element operating, in response to a first change in temperature of the battery, to disconnect the charging a path of the battery and establish a short circuit across the positive electrode and the negative electrode in a second state of operation, the switch element further operating to return to the initial state in response to a second change in temperature of the battery opposing that of said first change in temperature.

2. The non-aqueous electrolyte rechargeable battery according to claim 1, wherein the switch element includes:
   a temperature-sensitive element connected to one of the positive electrode and the negative electrode;
   a first conductive plate disposed on one side of the temperature-sensitive element and connected to said one of the positive electrode and the negative electrode via said temperature-sensitive element when said switch element is in said initial state of operation; and
   a second conductive plate, connected to the other one of the positive electrode and the negative electrode, disposed on the other side of the temperature-sensitive element opposite from the first conductive plate, wherein the temperature-sensitive element deforms to break connection with said first conductive plate and to electrically connect with the second conductive plate in the second state of operation in response to a change in temperature of the battery.

3. The non-aqueous electrolyte rechargeable battery according to claim 2 wherein the temperature-sensitive element is made of shape-memory alloy.

4. A non-aqueous electrolyte rechargeable battery comprising:
   an element for electromotive force including an electrode of first polarity and an electrode of second polarity;
   a battery case having an open top end for accommodating the element for electromotive force, and being electrically connected to the electrode of first polarity; and
   a closure assembly for closing the open top end of the battery case, including an external terminal, an internal terminal electrically connected to the electrode of second polarity, a switch element electrically connecting the external terminal and the internal terminal in an initial state, and a ring shaped conductive element electrically connected to the battery case and an electrical insulation electrically insulating the ring shaped conductive element from both of the external terminal and the internal terminal;
   the switch element being responsive to a first temperature change to break connection to the external terminal and effect electrical contact with the ring shaped conductive element to establish a second state of operation, breaking electrical connection between the battery and an external power source and establishing a short circuit to cause the battery to discharge; and
   the switch element being responsive to a second temperature change, opposing said first temperature change, to return to the initial state, re-establishing electrical connection between the battery and the external power source.

5. A non-aqueous electrolyte rechargeable battery, comprising:
   an element for electromotive force including an electrode of first polarity and an electrode of second polarity;
   a battery case having an open top end for accommodating the element for electromotive force, and being electrically connected to the electrode of first polarity; and
   a closure assembly for closing the open top end of the battery case, including an external terminal, an internal terminal electrically connected to the electrode of second polarity, a switch element electrically connecting the external terminal and the internal terminal in an initial state, and a ring shaped conductive element electrically connected to the battery case and an electrical insulation electrically insulating the ring shaped conductive element from both of the external terminal and the internal terminal;

the switch element being responsive to a first temperature change to break connection to the external terminal and effect electrical contact with the ring shaped conductive element to establish a second state of operation, breaking electrical connection between the battery and an external power source and establishing a short circuit to cause the battery to discharge; and the switch element being responsive to a second temperature change, opposing said first temperature change, to return to the initial state, re-establishing electrical connection between the battery and the external power source, wherein the electrical insulation between the ring shaped conductive element and the external terminal and the internal terminal is effected by a ring shaped gasket disposed on an inner peripheral side of the ring shaped conductive element, the external terminal and the internal terminal being arranged on an inner side of the ring shaped gasket, the ring shaped conductive element having an inwardly extending protrusion passing through a hole formed in the ring shaped gasket towards between the external terminal and the internal terminal.

6. The non-aqueous electrolyte rechargeable battery according to claim 5, wherein the switch element makes electrical contact with the protrusion of the ring shaped conductive element to form the short circuit.

7. The non-aqueous electrolyte rechargeable battery according to claim 6 wherein the switch element is made of a shape-memory alloy.

8. The non-aqueous electrolyte rechargeable battery according to claim 1, wherein the switch element includes a resistive element in the short circuit.

9. The non-aqueous electrolyte rechargeable battery according to claim 2, wherein the switch element includes a resistive element in the electrical connection between the temperature-sensitive element and the second conductive plate in the second state of operation to form the short circuit.

10. The non-aqueous electrolyte rechargeable battery according to claim 4, wherein the switch element includes a resistive element in the short circuit.

11. The non-aqueous electrolyte rechargeable battery according to claim 5, wherein the switch element includes a resistive element in the short circuit.

12. The non-aqueous electrolyte rechargeable battery according to claim 6, wherein the switch element includes a resistive element in the short circuit.

\* \* \* \* \*